March 22, 1966  C. J. SNABES ETAL  3,241,630
AUTOMOTIVE VEHICLE STEERING SYSTEM
Filed Sept. 23, 1963  4 Sheets-Sheet 1

CASMIR J. SNABES
WARREN A. VAN WICKLIN, JR.
INVENTORS

BY John L. Faulkner
Keith L. Gerschling
ATTORNEYS

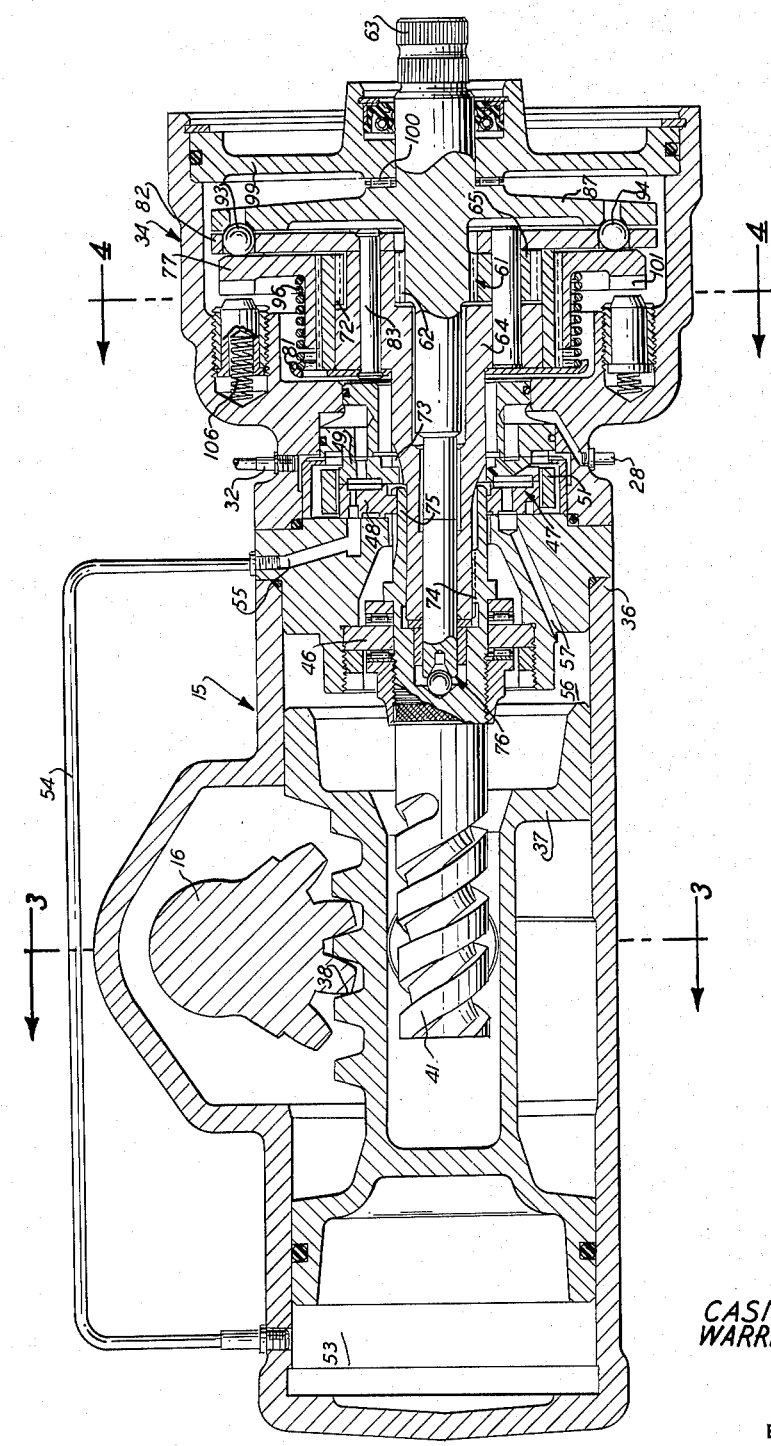

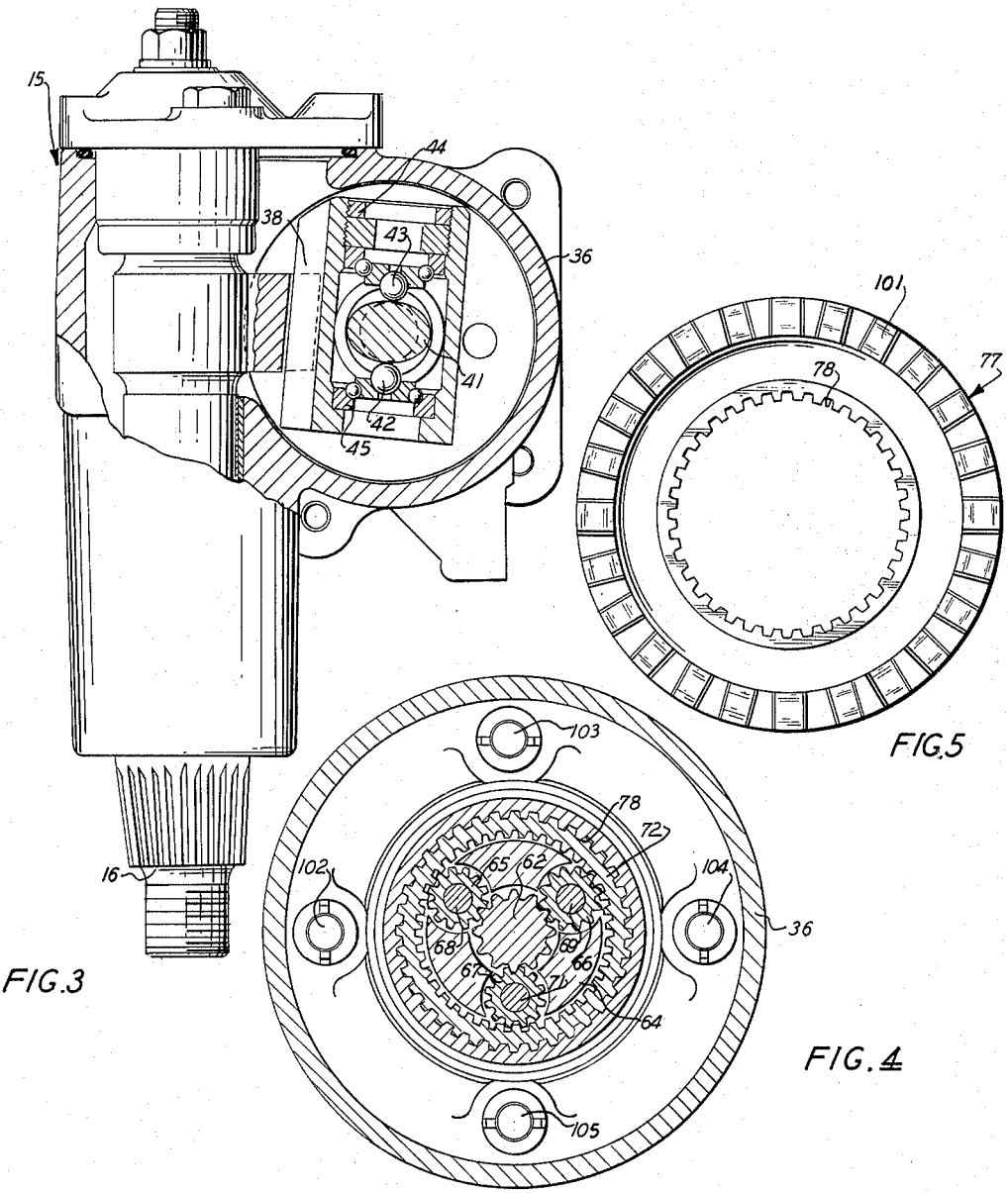

March 22, 1966   C. J. SNABES ETAL   3,241,630
AUTOMOTIVE VEHICLE STEERING SYSTEM Filed Sept. 23, 1963   4 Sheets-Sheet 4

CASMIR J. SNABES
WARREN A. VAN WICKLIN, JR.
INVENTOR

BY John A. Faulkner
Keith L. Gerschling
ATTORNEYS

United States Patent Office 3,241,630
Patented Mar. 22, 1966

3,241,630
AUTOMOTIVE VEHICLE STEERING SYSTEM
Casmir J. Snabes, Garden City, and Warren A. Van Wicklin, Jr., Dearborn, Mich., assignors to Ford Motor Company, Dearborn, Mich., a corporation of Delaware
Filed Sept. 23, 1963, Ser. No. 310,587
8 Claims. (Cl. 180—79.2)

This invention relates to an automotive vehicle steering system and more particularly to an automotive vehicle steering system in which the over-all steering ratio is increased when the torque on the steering wheel exceeds a predetermined value.

In modern day automotive vehicles a fairly high steering ratio is employed with both manually operated and power assisted steering systems. This high ratio is necessary in manually operated gears to reduce steering efforts to reasonable values, and it has been carried over into most power assisted steering systems. The high steering ratio has a disadvantage, however, since it brings about slow response of the vehicle to movements of the steering wheel. In other words, the steering wheel must be turned through quite a large angular displacement to bring about a response to movement of the steering wheel. bring about a response to movement of the sterring wheel.

A solution to this problem is to provide a power steering system in which the over-all steering ratio is substantially reduced. This brings about quick response to the movement of the steering wheel, and it also provides sufficient power assist for parking and slow turns. This system, however, may be very difficult for the average driver to handle if the power steering system should fail or become inoperative for any reason. This may happen if the vehicle stalls when the driver is executing a sharp turn. In such case, high torques are required on the steering wheel to bring about movement of the steerable road wheels. With a low steering ratio and a large vehicle, this effort may be in excess of the normal strength that can be exerted on the steering wheel by an ordinary vehicle operator in the normal reaction time.

In the present invention, means are provided for raising the over-all steering ratio when the torque or force necessary to move the steerable road wheels exceeds a predetermined level. In the preferred embodiment of the invention, an automatic steering ratio changing mechanism is employed between the steerable road wheels and the steering wheel. This automatic steering ratio changing mechanism has a set of change gears that may be shifted from a low gear ratio to a high gear ratio when the force or torque on the steering member exceeds the predetermined value. The immediately changes the over-all steering ratio from a low value to a high value, and it takes much less effort on the part of the vehicle operator to bring about a vehicle response. This permits the vehicle operator to control the vehicle properly even though the power steering system has failed in an automative vehicle in which a normal low over-all steering ratio is provided.

The invention is also useful in a manual steering gear that does not employ power assist. In such a manual gear a fairly low steering ratio may be employed. During parking maneuvers when very high loads are present on the steering system and large torques are required to turn the steerable road wheels the automatic ratio changing mechanism will shift from a low gear ratio to a high gear ratio when the force or torque on the steering member exceeds a certain predetermined value. As brought out previously, this changes the over-all steering ratio from a low value to a high value and it takes much less effort on the part of the vehicle operator to maneuver and park the vehicle.

Another term of a high over-all steering ratio steering system is a slow ratio system, because the vehicle is slow to respond to movements of the steering wheel. Similarly, another term for a low over-all ratio steering system is a fast ratio steering system, because the vehicle responds rapidly to movements of the steering wheel.

An object of the invention is the provision of a means that will permit a fast ratio power steering system to be employed safely even though the power assist system should fail for some reason.

Another object of the invention is the provision of a steering system in which the over-all steering ratio is increased when the force or torque applied to a steering member exceeds a predetermined level.

A further object of the invention is the provision of a steering system for an automotive vehicle in which the torque necessary to turn a steering wheel will be abruptly lowered when the torque on the wheel exceeds a predetermined level.

Another object of the invention is the provision of a power steering system for an automotive vehicle which is safe and reliable, and employs a responsive low ratio steering system.

Other objects and attendant advantages of the invention will become more apparent as the specification is considered in connection with the attached drawings, in which:

FIGURE 2 is a longitudinal sectional view of the steering gear and the automatic ratio changing mechanism of the present invention;

FIGURE 3 is a sectional view partially in elevation taken along the lines 3—3 of FIGURE 2;

FIGURE 4 is a sectional view taken along the lines 4—4 of FIGURE 2;

FIGURE 5 is a plan view of the clutch member of this invention;

Figure 1:
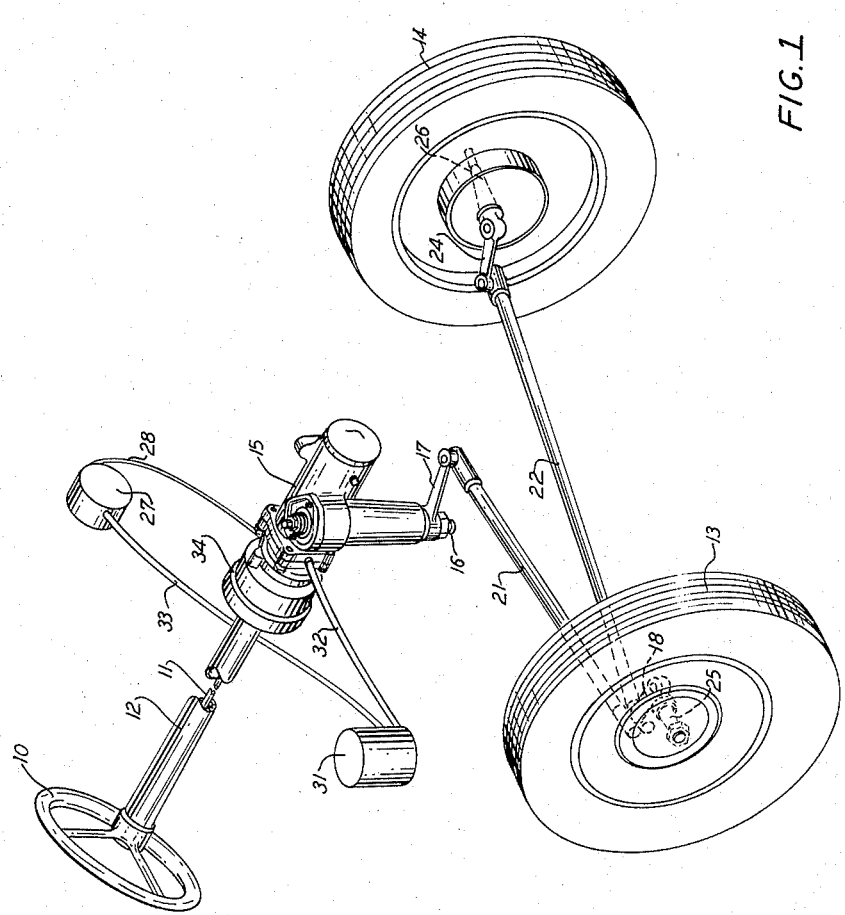
FIGURE 1 is a schematic of the steering system of the invention in an automotive vehicle.
Figure 6:
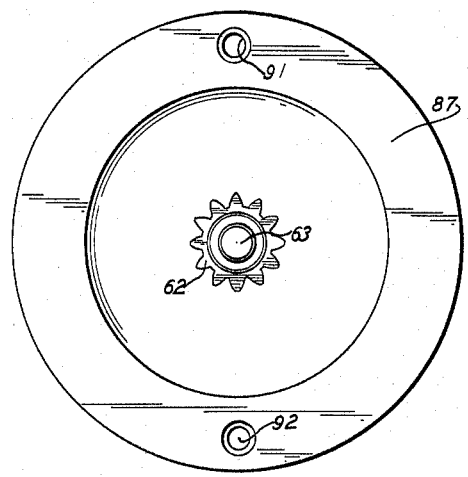
FIGURE 6 is a plan view of the input shaft of the steering mechanism shown in FIGURE 2.

Referring now to the drawings in which like reference numerals designate like parts throughout the several views thereof, there is shown in FIGURE 1 a steering wheel 10 that is connected to a steering shaft 11. The steering shaft 11 is enclosed by a steering shaft housing 12. The steering shaft 11 and steering wheel 10 are operatively coupled to steerable road wheels 13 and 14 of an automotive vehicle through a steering gear 15 which has an output shaft 16 connected to pitman arm 17. The pitman arm 17 is connected to steering knuckle 18 by means of rod 21. A cross rod 22 connects the steering knuckle 18 of steerable road wheel 13 with corresponding steering knuckle 24 of the steerable road wheel 14. Steerable road wheels 13 and 14 are mounted in the conventional way upon spindles 25 and 26.

The steering gear 15 may be of the fluid power assisted type in which a power steering pump 27 supplies fluid to the steering gear through a conduit 28. It should be understood also that a manual steering gear that does not employ power assist can be used in the invention. Fluid is received from the steering gear 15 in a tank 31 through a conduit 32, and the tank 31 is connected to the power steering pump 27 through a conduit 33. Interposed between the steering wheel 10 and the steerable road wheels 13 and 14 is an automatic steering ratio changing mechanism 34 which, in the preferred embodiment of the invention as shown in FIGURE 1, is positioned intermediate the steering shaft 11 and the steering gear 15.

Referring now to FIGURE 2, it can be seen that the steering gear 15 and the automatic steering ratio changing mechanism 34 may be contained within a housing 36. The steering gear 15 may be any conventional steering gear. In the drawing, however, there is shown an integral or in-line type power steering gear in which a power piston 37 is positioned within the housing 36. This power piston is connected to the output shaft 16 through a gear set 38 and is also connected to a worm 41 through a pair of balls 42 and 43 as shown in FIGURE 3. The balls 42 and 43 may be carried by the power piston 37 by means of ball bearing supported carriers 44 and 45. The worm 41 may have a variable lead groove so that a variable ratio steering gear is provided in which the steering ratio on center is higher than the steering ratio in the off center position. The worm 41 is rotatably supported in the housing 36 by means of a standard thrust and radial bearing arrangement 46.

The fluid for applying power assist is under the control of a fluid control valve 47 which may be of the rotary type having a pair of rotary plates 48 and 49 that are rotatable relative to one another against the bias of a circumferential C-spring 51. The conduit 28 delivers fluid to the valve 47 and the fluid under pressure is delivered to the chamber 53 through conduits 54 and 55 when the steering wheel 10 is turned in one direction. When the steering gear is turned in the other direction, fluid is delivered to chamber 56 comprising the remainder of the casing 36 through conduit 57. In both instances, fluid is returned to the tank 31 from the valve 47 by means of the conduit 32. This valve is more fully described in United States patent application S.N. 248,930 filed January 2, 1963 in the name of John R. Elwell and assigned to the assignee of this invention.

The automatic steering ratio changing mechanism 34 includes a planetary gear assembly 61 that has a sun gear 62 formed integrally with input shaft 63. The input shaft 63 may be coupled through any suitable flexible coupling to the steering wheel shaft 11. The planetary gear assembly 61 also includes a planet carrier 64 having a plurality of planet gears 65, 66 and 67 mounted on pins 68, 69 and 71 respectively and engaging the sun gear 62. A ring gear 72 also engages the planet gears 65 through 67.

The planet carrier 64 serves as the output member of the automatic steering ratio changing mechanism 34, and it is keyed to the rotary plate 49 of fluid control valve 47 as shown at 73. The planet carrier 64 is also coupled to the worm 41 by a set of loose splines 74 having a total lash of approximately 20°. The worm 41 is keyed at 75 to the rotary plate 48 of fluid control valve 47. It can be appreciated that the input shaft 63 is rotatably mounted within both the planet carrier 64 and the worm 41 by a radial and thrust bearing arrangement shown generally at 76.

Figure 7:
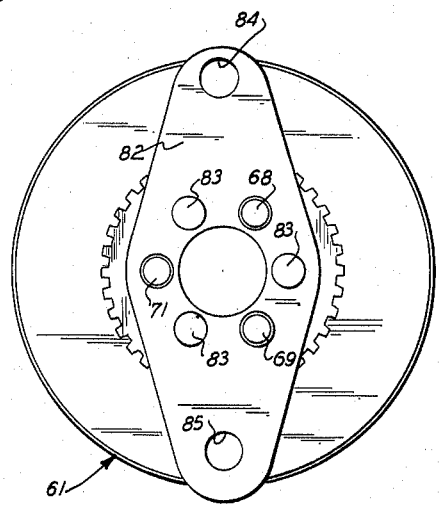
FIGURE 7 is a plan view of the planetary gear set assembly including a portion of the clutch employed with the steering mechanism of FIGURE 2.

The ring gear 72 carries an annular clutch member 77 that is capable of sliding axially on the ring gear by reason of a plurality of serrations or splines 78. The planet carrier 64 has a spring retainer 81 positioned on one side thereof and a side plate 82 positioned on the other side thereof by means of a plurality of rivets 83. The side plate 82 is shown in more detail in FIGURE 7, and it can be seen that it has two oppositely disposed apertures 84 and 85 at different radial distances from the center of rotation of this plate on the input shaft 63.

The input shaft 63 includes a circular plate 87 which has two oppositely located apertures or detent pockets 91 and 92 that are smaller in diameter than the apertures 84 and 85 in the side plate 82. A pair of detent balls, indicated by the numerals 93 and 94, are positioned within the apertures 84 and 85 respectively, and also engage the apertures or detent pockets 91 and 92 in the circular plate 87 of input shaft 63. These detent balls have slightly smaller diameters than the apertures 84 and 85, but have diameters larger than the apertures or detent pockets 91 and 92. The detent pockets have beveled annular edges to facilitate movement of the detent balls 93 and 94 into and out of these detent pockets.

The end of the housing 36 is covered by an end plate 99 which rotatably supports the input shaft 63. It provides an abutment for thrust bearing 100 that, in cooperation with the bearing arrangement 76, takes the thrust placed on the input shaft as the detent balls 93 and 94 move out of and into detent pockets 91 and 92.

A clutch spring 96 urges the clutch member 77 against the detent balls 93 and 94 so that they are firmly engaged in the apertures or detent pockets 91 and 92 of the circular plate 87. The clutch member 77 has a toothed face 101 that is positioned in opposed relationship to a plurality of stop members 102, 103, 104 and 105 that are carried by the housing 36. Each of the stop members is spring urged outwardly by means of spring members 106.

During normal power steering operations, the clutch spring 96 retains the automatic steering ratio changing mechanism 34 in the position shown in the drawings. Frictional and other static forces keep the planetary gear set 61 in its locked positions so that all of the gears, sun gear 62, planet gears 65, 66 and 67, and ring gear 72 rotate together as well as the planet carrier 64 and the annular clutch member 77. Thus, the planet carrier 64 will be driven directly from the input shaft 63 at a 1:1 gear reduction ratio. The planet carrier 64 in turn drives the worm 41 through the valve plates 48 and 49 and C-spring 51 when power assist is not needed for steering the automotive vehicle.

When the torque on the input shaft 63 transmitted through the steering wheel 10 and steering wheel shaft 11 exceeds a certain value, the power assist mechanism, as shown in FIGURE 1 and fully described previously, comes into play because of the relative rotation of the valve plates 48 and 49 against the bias of C-spring 51. This provides normal power assist operation and permits a fast or low over-all steering ratio to be employed for fast response and quick maneuvering.

If the power steering assist system should fail, for example, by stalling of the engine that drives the power steering pump 27, the low steering ratio may cause the driver to have extreme difficulty in controlling the vehicle. The automatic ratio changing mechanism then comes into play to provide a higher steering ratio. This is caused by a predetermined torque applied to the steering wheel 10.

When torque applied to the steering wheel 10 is sufficient to overcome the clutch spring 96, the detent balls 93 and 94 come out of the detent pockets 91 and 92 and force the clutch member 77 to the left so that the clutch teeth on toothed face 101 engage the stop members 102 through 105. The clutch member 77 is forced to the left by the detent balls 93 and 94 riding out of the detent pockets or apertures 91 and 92 and engaging the face of the circular plate member 87. This stops rotation of the clutch member 77 and the ring gear 72. Planetary gear action takes place and the planet carrier 64 is rotatably driven by the sun gear 62 through the planet gears 65, 66 and 67. This changes the gear ratio of the automatic ratio changing mechanism from a 1:1 or direct drive relationship to a higher gear ratio on the order of two or three to one. This substantially reduces the effort needed to turn the steering wheel 10 and to control the vehicle in which the steering system is mounted.

If the clutch teeth on the toothed face 101 of the clutch member 77 blocks the entry of the stop members 102 through 105 into the spaces between the teeth as the clutch member 77 is forced to the left, the stop members are depressed against the bias of springs 106. Any rotation of either the input shaft 63 or the planet carrier 64 will cause a rotation of the ring gear 72 and the clutch member 77. This rotation permits the stop members 102 through 105 to drop into the spaces between the clutch teeth as soon as these spaces are rotated into position.

The preload of the clutch spring 96 is selected to permit the changing of the gear from the direct drive to the higher gear ratio at an input torque on the steering wheel 10 between the torque at which the plates 48 and 49 of the fluid control valve 47 have been rotated sufficiently to close the orifices of the plates and the torque at which the manual drive splines 74 engage after rotating through normal lash. The amount of this torque is determined by the spring rate of the C-spring 51 that controls the relative rotation of valve plates 48 and 49. As a result, the change in steering ratio occurs when the C-spring 51 is under considerable stress and when the splines 74 are about to engage to provide complete manual operation of the gear. This tends to diminish any unusual feel as the shifting action takes place.

When the shifting action has taken place, manually controlled steering operation results since there is a mechanical connection from the steering wheel 10 to the steerable road wheels 13 and 14. This occurs through the steering wheel 10, steering wheel shaft 11, input shaft 63, sun gear 62, planet gears 65, 66 and 67, planet carrier 64, splines 74 and worm 41, then through the remainder of the gear train and steering linkage previously described.

When the torque necessary to turn the steering wheel 10 falls below a predetermined level, for example, if the power steering system again commences to function, the planetary gear set 61 will return to the direct drive relationship. This will occur only when the detent balls 93 and 94 are aligned with their respective detent pockets or apertures 91 and 92 in the circular plate 87 on the input shaft 63. At this time, the clutch spring 96 will force these balls back into the detent pockets 91 and 92 and the teeth on the toothed clutch face 101 will come out of engagement with the stop members 102 through 105. This feature just described maintains the center adjustment of the steering wheel so that there is always a unique relationship between the input shaft 63 and the planet carrier 64 when the planetary gear assembly 61 is shifted from its direct drive relationship to its higher gear ratio and back from its higher gear ratio to its direct drive relationship. As previously stated, the detent pockets 91 and 92 in the circular plate 87 are located at different radiuses with respect to their center of rotation. The apertures 84 and 85 in the side plate 82 are also located at different radiuses to match those of detent pockets 91 and 92. This assures accurate orientation of the input shaft 63 relative to the planet carrier 64 when shifting actions take place. It can be appreciated if the detent pockets 91 and 92 and the apertures 84 and 85 were located on the same radius that a 180° error could take place during shifting operations.

It can be appreciated from an inspection of FIGURES 2, 4, 6 and 7, that the automatic ratio changing mechanism 34 has been designed to provide proper load balancing. Two detent balls 93 and 94 are provided to reduce the eccentricity of the ball lift force that actuates the clutch member 77. If only one ball were provided, the eccentricity of the loading would be quite large and very likely would prevent smooth action as the toothed clutch face 101 came into engagement with the stop members 102 through 105. Similarly, four clutch stop members are employed and by using oppositely disposed pairs of clutch pins, the eccentricity of the reaction torque and consequently the bending force on the input shaft is eliminated.

It is evident that this steering system, including the automatic ratio changing mechanism, may be suitably employed with any automotive vehicle that is controlled through any sort of a manually operated steering member. Any type of steering member that functions to control the vehicle as does the steering wheel 10 may be employed with the system.

As will be apparent to those skilled in the art, the automatic steering ratio changing mechanism of the invention can be employed also with a manual steering gear that does not have power assist. The automatic ratio changing mechanism can be designed to shift only at loads encountered during steering operations that take place when the vehicle is substantially stationary. For example, such loads are encountered during parking operations, and the shift from the low ratio to the high ratio during these maneuvers will be of great assistance in the parking of the vehicle.

The present invention thus provides a steering system in which the over-all steering ratio is increased appreciably when a predetermined torque is applied to the steering wheel. It may be used in a power steering system with a low ratio employed for ordinary driving operations in which power assist is available. If the power assist system should fail for any reason, the automatic steering ratio changing mechanism employed with the invention will immediately increase the over-all steering ratio in response to predetermined torque on the steering wheel. A fast or low over-all steering ratio thus may be safely and reliably employed with a power steering system. As brought out above, the system may also be employed in a manual steering system to provide increased steering ratios during parking and other low speed steering maneuvers.

It will be understood that the invention is not to be limited to the exact construction shown and described, but that various changes and modifications may be made without departing from the spirit and scope of the invention as defined in the appended claims.

What is claimed as new is:

1. In a steering system for an automotive vehicle, a steering wheel, a steerable road wheel, means coupling said steering wheel and said steerable road wheel at a predetermined steering ratio, and means associated with said steering wheel and operable by a predetermined torque exerted on said steering wheel in either direction for increasing the steering ratio a substantial amount over said predetermined ratio.

2. In a steering system for an automotive vehicle, a manually operable steering member, a steerable road wheel, means for coupling said manually operable steering member and said steerable road wheel at one steering ratio when the force on said normally operable steering member is below a predetermined force and for coupling said manually operable steering member and said steerable road wheel at a higher steering ratio when the force on said steering member exceeds said predetermined force in either direction.

3. In a steering system for an automotive vehicle, a manually operable steering member, a steerable road wheel, gear means shiftable between a first gear ratio and a second gear ratio coupling said manually operable steering member and said steerable road wheel, said second gear ratio being higher than said first gear ratio, and means associated with said steering member and operable by a predetermined force on said steering member for shifting said gear means from said first gear ratio to said second gear ratio when the force applied to said manually operable steering member exceeds a predetermined magnitude in either direction.

4. In a steering system for an automotive vehicle the combination comprising a steering wheel, a steerable road wheel, gear means coupling said steering wheel and said steerable road wheel, said gear means including a ratio changing gear train capable of being changed from a first ratio to a second higher ratio, and means coupled to said ratio changing gear train and said steering wheel for changing said ratio changing gear train from said first ratio to said second ratio when the torque on said steering wheel exceeds a preselected value in either direction.

5. In a steering system for an automotive vehicle the combination comprising a steering wheel, a steerable road wheel, gear means connecting said steering wheel and said steerable road wheel, said gear means including means for connecting said steering wheel to said steerable road wheel at one gear reduction ratio during normal driving operations and for connecting said steering wheel to said steerable road wheel at a higher gear reduction when the torque necessary to turn said steering wheel exceeds a predetermined value in either direction.

6. In a steering system for an automotive vehicle the combination comprising a steering wheel, a steerable road wheel, reduction gear means and an automatic steering ratio changing mechanism coupling said steering wheel and said steerable road wheel, said automatic steering ratio changing mechanism comprising a planetary gear set having a sun gear, a planet gear, a planet gear carrier and a ring gear, said steering wheel being connected to said sun gear, and said reduction gear means being connected to said planet carrier, all of the gears of said planetary gear set rotating as a unit during normal driving conditions whereby said reduction gear is driven directly from said steering wheel, and means coupled to said ring gear for causing said ring gear to become stationary whereby said sun gear rotatably drives said planet gear carrier when the torque on said steering gear exceeds a predetermined level in either direction.

7. The combination of claim 6 in which said last mentioned means comprises an annular clutch member slidably and nonrotatably mounted on the outer periphery of said ring gear, said annular clutch member having a plurality of teeth, stop means cooperating with said teeth, spring means urging said annular clutch member out of engagement with said stop means, and means coupled to said steering wheel for sliding said annular clutch member axially into engagement with said stop means when the torque on said steering wheel exceeds a predetermined level in either direction.

8. In a steering system for an automotive vehicle, a steering wheel, a steerable road wheel, gear means having an input shaft coupled to said steering gear and an output shaft coupled to said steerable road wheels, said gear means including a ratio changing gear train capable of being changed from a first ratio to a second higher ratio, and clutch means coupled to said input shaft and said ratio changing gear train for shifting said ratio changing gear train from said first ratio to said second ratio when the torque on said steering wheel exceeds a predetermined value in either direction and for shifting said ratio changing gear train from said second ratio to said first ratio when the torque on said steering wheel falls below said predetermined value and when said input and said output shafts are in the same relative angular position as when the shift from said first ratio to said second ratio occurred.

References Cited by the Examiner

UNITED STATES PATENTS

| | | | |
|---|---|---|---|
| 1,909,330 | 5/1933 | Banker | 74—785 X |
| 1,981,591 | 11/1934 | Edmondson | 180—79.2 X |
| 2,417,732 | 3/1947 | Bland et al. | 74—751 X |
| 2,494,738 | 1/1950 | Booth | 180—79.3 X |
| 2,788,671 | 4/1957 | Talbot | 180—79.2 X |

KENNETH H. BETTS, *Primary Examiner.*

BENJAMIN HERSH, R. C. PODWIL,
*Assistant Examiners.*